US010207707B2

(12) United States Patent
Kurata

(10) Patent No.: US 10,207,707 B2
(45) Date of Patent: Feb. 19, 2019

(54) DRIVING ASSISTANCE DEVICE

(71) Applicant: SUZUKI MOTOR CORPORATION, Hamamatsu-shi, Shizuoka (JP)

(72) Inventor: Koji Kurata, Hamamatsu (JP)

(73) Assignee: SUZUKI MOTOR CORPORATION, Hamamatsu-Shi (JP)

(*) Notice: Subject to any disclaimer, the term of this patent is extended or adjusted under 35 U.S.C. 154(b) by 0 days.

(21) Appl. No.: 15/849,246

(22) Filed: Dec. 20, 2017

(65) Prior Publication Data

US 2018/0208196 A1 Jul. 26, 2018

(30) Foreign Application Priority Data

Jan. 23, 2017 (JP) .................................. 2017-009446

(51) Int. Cl.
| | |
|---|---|
| *B60W 30/095* | (2012.01) |
| *G06K 9/00* | (2006.01) |
| *G08G 1/16* | (2006.01) |
| *G05D 1/00* | (2006.01) |

(52) U.S. Cl.
CPC ....... *B60W 30/0956* (2013.01); *G05D 1/0088* (2013.01); *G06K 9/00805* (2013.01); *G06K 9/00825* (2013.01); *G08G 1/162* (2013.01); *G08G 1/165* (2013.01); *G08G 1/166* (2013.01); *B60W 2420/42* (2013.01); *B60W 2550/10* (2013.01)

(58) Field of Classification Search
CPC ............ B60W 30/0956; G05D 1/0088; G06K 9/00805; G06K 9/00825; G08G 1/166
USPC .......................................................... 340/435
See application file for complete search history.

(56) References Cited

U.S. PATENT DOCUMENTS

| | | | | |
|---|---|---|---|---|
| 5,554,983 A | * | 9/1996 | Kitamura ................. | G08G 1/04 340/905 |
| 2010/0007500 A1 | * | 1/2010 | Mestres ................. | G06Q 10/08 340/572.4 |
| 2018/0172828 A1 | * | 6/2018 | Moody ................... | G01S 17/58 |

FOREIGN PATENT DOCUMENTS

JP 2010-108371 A 5/2010

* cited by examiner

*Primary Examiner* — John A Tweel, Jr.
(74) *Attorney, Agent, or Firm* — Stein IP, LLC

(57) ABSTRACT

There is provided a driving assistance device configured to be equipped in a subject vehicle. An imaging unit is configured to acquire an image of a preceding vehicle running in front of the subject vehicle equipped with the driving assistance device. A cargo-falling predicting unit is configured to predict whether a cargo loaded on a loading platform of the preceding vehicle will fall off, from change with time in an image of the cargo or an image of an accompanying object of the cargo on the basis of the image acquired by the imaging unit. An information providing unit is configured to provide information on falling of the cargo if the cargo-falling predicting unit predicts that the cargo will fall off.

9 Claims, 10 Drawing Sheets

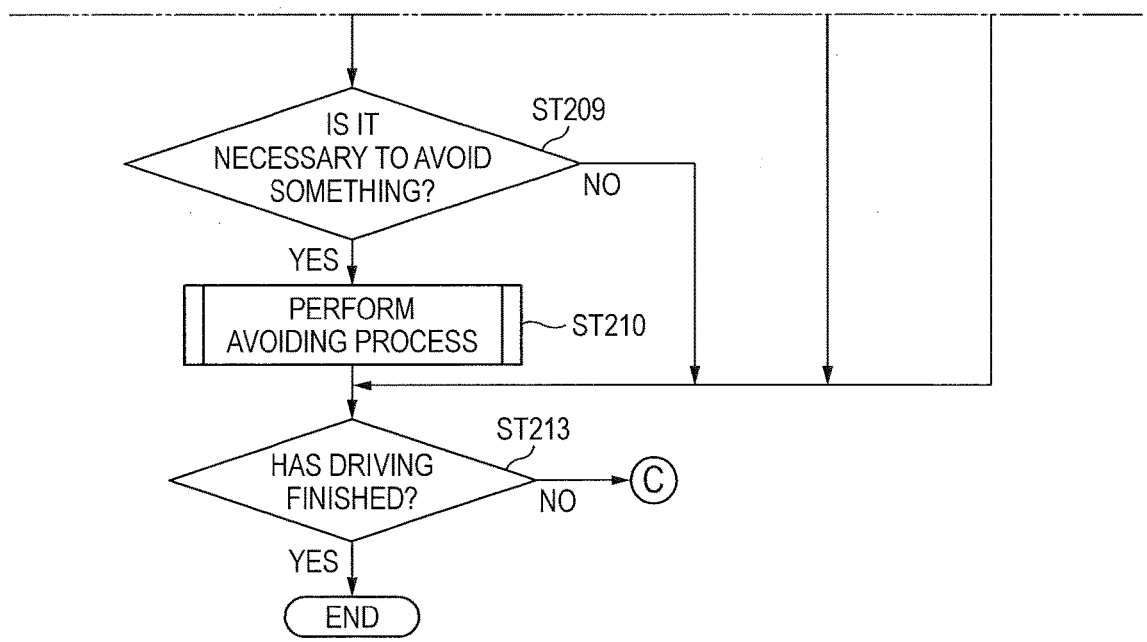

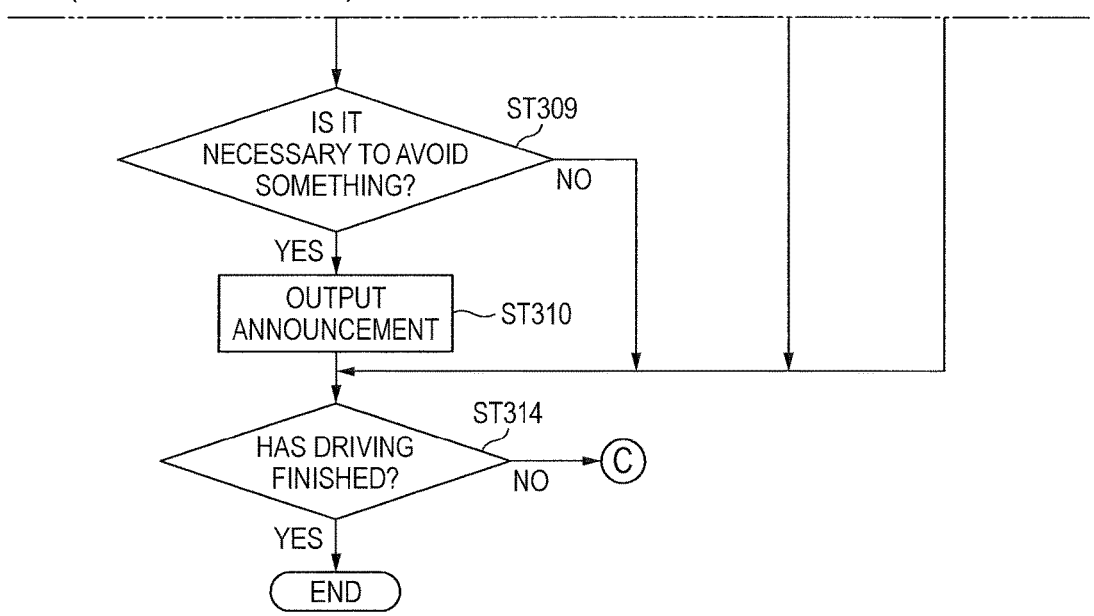

DRIVING ASSISTANCE DEVICE

CROSS-REFERENCE TO RELATED APPLICATIONS

The disclosure of Japanese Patent Application No. 2017-009446 filed on Jan. 23, 2017, including specification, drawings and claims is incorporated herein by reference in its entirety.

TECHNICAL FIELD

The present invention relates to a driving assistance device.

BACKGROUND

Sometimes, when a subject vehicle is running, cargoes suddenly fall off a loading platform of a preceding cargo vehicle toward the front of the subject vehicle. In this case, the driver starts to monitor the falling cargoes (hereinafter, referred to as falling objects). Then, the driver takes a measure after determining that the falling objects will endanger the driver. Therefore, the driver may not be able to avoid the falling objects.

Also, the falling objects may exert an influence even on vehicles (hereinafter, referred to as oncoming vehicles) running in lanes opposite to the lane where the cargo vehicle runs. Especially, in a curve, if cargoes fall off the cargo vehicle toward the opposite lanes, it is very difficult for oncoming vehicles to avoid the cargoes.

Also, in a case where a saddle-ridden type vehicle is running between the subject vehicle and the cargo vehicle, the falling objects may cause the saddle-ridden type vehicle to fall down. For this reason, the driver of the subject vehicle needs to monitor both of the falling objects and the saddle-ridden type vehicle and take a measure. Therefore, the burden on the driver is large.

In the related art, it has been proposed a device which repeatedly acquires an image of the view in front of a subject vehicle equipped with the device, compares a plurality of consecutive images acquired in chronological order, sets a first horizontal line "A", for example, with reference to the loading platform of a preceding vehicle in the plurality of images, sets a horizontal line "B" below the horizontal line "A", detects that an object has crossed each of the horizontal lines "A" and "B", calculates the speed at which the object moves downward, on the basis of the distance between the horizontal lines "A" and "B" and the image acquisition interval, quantifies the possibility that the object is a falling object, and warns a driver if the possibility is larger than a threshold (see Patent Document 1 for instance).

Patent Document 1: Japanese Patent Application Publication No. 2010-108371A

Therefore, it is possible to reduce the risk of missing a falling object according to the technology disclosed in Patent Document 1. However, in Patent Document 1, since a falling object is detected if the falling object crosses the horizontal line "A" set with reference to the loading platform, the driver starts to monitor the falling object after falling of the object occurs and takes a measure after determining that the falling object will endanger the driver. Consequently, similarly in the related art, if cargoes suddenly fall off, the driver may not be able to avoid the falling cargoes.

Also, Patent Document 1 does not mention about the point that the falling objects may exert the oncoming vehicles and the point that there is a risk that saddle-ridden type vehicles running in front of the subject vehicle equipped with the device may fall down.

SUMMARY

It is therefore one of objects of at least one aspect of the embodiments of the present invention to provide a driving assistance device for detecting a warning sign that a cargo loaded on the loading platform of a preceding vehicle would fall off, and warning that the cargo will fall off, thereby capable of improving preventive safety.

According to an aspect of the embodiments of the present invention, there is provided a driving assistance device configured to be equipped in a subject vehicle, comprising: an imaging unit configured to acquire an image of a preceding vehicle running in front of the subject vehicle equipped with the driving assistance device; a cargo-falling predicting unit configured to predict whether a cargo loaded on a loading platform of the preceding vehicle will fall off, from change with time in an image of the cargo or an image of an accompanying object of the cargo on the basis of the image acquired by the imaging unit; and an information providing unit configured to provide information on falling of the cargo if the cargo-falling predicting unit predicts that the cargo will fall off.

According to the aspect of the embodiments of the present invention, it is possible to detect a warning sign that the cargo loaded on the loading platform of the preceding vehicle would fall off, and warn that the cargo will fall off, thereby capable of improving the preventive safety.

DETAILED DESCRIPTION OF THE EMBODIMENTS

Figure 1:
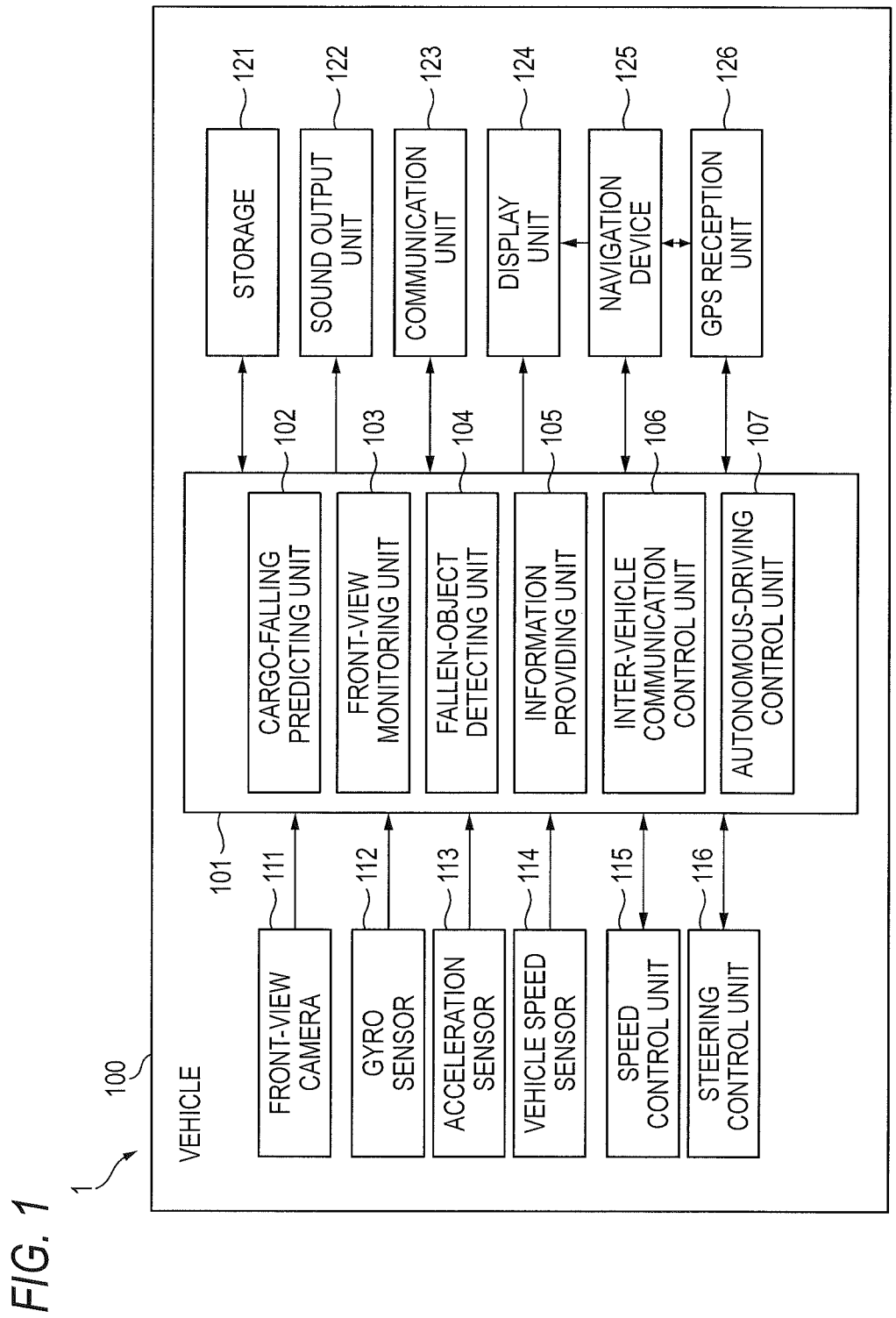
FIG. 1 is a view illustrating a configuration of a driving assistance device according to an embodiment.

Hereinafter, an embodiment of the present invention will be described in detail with reference to the accompanying drawings. Although a four-wheeled automobile which is an autonomous vehicle and uses a driving assistance device according to the embodiment of the present invention will be described as an example, objects to which the embodiment of the present invention can be applied are not limited thereto, and the embodiment of the present invention can be applied to various objects. For example, the driving assistance device according to some embodiments of the present invention may be applied to other types of vehicles (for example, saddle-ridden type vehicles like motorcycles and motor tricycles).

Also, the embodiment of the present invention effectively works even in vehicles which are manual, not autonomous. Specifically, a driver may be in a careless driving state (a state in which the driver is more inattentive than usual) due to fatigue. In such a careless driving state, since the vehicle control agent during driving is more likely to be the driving assistance device mounted on the subject vehicle than the driver, the embodiment of the present invention effectively works.

<Overview>

An event that a cargo falls off a loading platform does not just suddenly start. Before that, there is a warning sign (a precursor). Accordingly, if the cargo loaded on the loading platform of a preceding vehicle is continuously monitored, it would be possible to predict that event.

There is provided a driving assistance device for consecutively acquiring an image of a cargo loaded on the loading platform of a preceding vehicle (hereinafter, referred to as a cargo vehicle) running in front of a subject vehicle equipped with the driving assistance device, for example, at intervals of a certain time, continuously monitoring change in an external appearance of the corresponding cargo by comparing the image acquired at a certain time point with the subsequent images, and determining whether the cargo will fall off on the basis of the amount of change in the external appearance.

Specifically, there is provided a driving assistance device configured to be equipped in a subject vehicle, including: an imaging unit configured to acquire an image of a preceding vehicle (e.g., a cargo vehicle) running in front of the subject vehicle equipped with the driving assistance device; a cargo-falling predicting unit configured to predict whether a cargo loaded on a loading platform of the preceding vehicle will fall off, from change with time in an image of the cargo or an image of an accompanying object of the cargo on the basis of the image acquired by the imaging unit; and an information providing unit configured to provide information on falling of the cargo if the cargo-falling predicting unit predicts that the cargo will fall off.

Here, the term "cargo" means an object having such a sufficient volume that the object can be recognized as a bundle. As specific examples of cargoes, boxed objects (cargoes using boxes as packaging materials), elongated objects (for example, square timbers), and soil (such as dirt, sand, and stone) can be taken. Since elongated objects are rarely contained in loading platforms, falling of elongated objects attributable to cargo collapse exerts a significant influence. Therefore, vehicles carrying elongated objects are some of vehicles that need to be monitored most carefully.

Also, an accompanying object of the cargo means an item accompanying the cargo when the cargo is carried. Examples of such accompanying objects include fasteners for fixing the cargo to the loading platform. As specific examples of such fasteners, ropes, belts, and sheets, and the like can be taken.

Also, it is preferable that the change with time in the image of cargo or the accompanying object of the cargo is change in a profile of the cargo or the accompanying object of the cargo.

The profile of the cargo or the accompanying object of the cargo means the state of the cargo or the accompanying object which can be observed from the outside, and includes the external appearance, the outline, the outer shape, and the contour.

For example, in a case where a plurality of cargoes are laid out flat in the horizontal direction or are stacked on the loading platform, change in the profile of the cargoes can be monitored by recognizing the whole of the plurality of cargoes. By the way, in general, since cargoes positioned high on the loading platform easily sway and shift, and thus are likely to fall off, change in the profile of the upper part of the whole of the plurality of cargoes is important. Therefore, the profile of the upper part may be extracted and monitored.

The change in the profile of the accompanying object of the cargo may be caused, for example, by slackening of ropes, belts, sheets. If ropes slacken, the cargo easily falls off. Therefore, by recognizing and monitoring the change in the lengths of ropes and belts or the change in the external appearances of sheets, it is possible to recognize a warning sign that the cargo will fall off.

Also, in a case where the cargo is covered with a sheet, the sheet may flutter in the wind during running. However, since most of the cases where sheets simply flutter and the cases where the external appearances of sheets continuously change due to cargo collapse are distinguishable, it rarely becomes a problem.

It is preferable that the driving assistance device according to the embodiment further includes a fallen-object detecting unit configured to detect whether the cargo is moved to a rear side or a lateral side relative to the loading platform and is moved toward a ground. Also, in this case, it is preferable that the driving assistance device further includes a saddle-ridden type vehicle monitoring unit configured to monitor a saddle-ridden type vehicle running between the subject vehicle and the preceding vehicle (e.g., the cargo vehicle) if the cargo-falling predicting unit predicts that cargo will fall off.

Also, it is preferable that the information providing unit provide the information on the falling of the cargo to at least one of the subject vehicle, an oncoming vehicle, another vehicle running a lane adjacent to a lane where the subject vehicle runs, and a following vehicle.

Also, it is preferable that the information providing unit provide the information on the falling of the cargo to the preceding vehicle (e.g., the cargo vehicle).

Information on the falling of the cargo is, for example, information for warning the driver that there is a warning sign that the cargo will fall off.

Provision of information from the subject vehicle equipped with the driving assistance device to the other vehicles (including the cargo vehicle) as described above can be realized, for example, using inter-vehicle communication; however, it is not particularly limited.

Also, it is preferable that even when determining that there is no possibility that the cargo will fall off, the cargo-falling predicting unit continues to predict whether the cargo will fall off, on the basis of information on a traffic environment of a course of the subject vehicle.

Here, the traffic environment includes the linear shapes of roads (including the planar linear shapes of curves and the like, and the vertical linear shapes of uphill roads, downhill roads, and the like), intersections, temporary stop locations, the installation locations of traffic signals, and the like.

Even though the cargo-falling predicting unit determines that there is no possibility that the cargo will fall off, if there is, for example, a curve, a sloping road, a traffic signal, a temporary stop location, or the like in the next course, a force of inertia acts on the cargo loaded on the loading platform of the cargo vehicle. Therefore, there is a possibility that the cargo will fall off. Therefore, even in such a case, the driving assistance device continues to predict whether the cargo will fall off. As a result, it is possible to further improve the preventive safety effect.

Information on the traffic environment can be included, for example, in map information to be used in a navigation device and GPS (Global Positioning System) signals to be received by a GPS reception unit; however, it can also be acquired from a server on the Internet by a communication unit. Also, the driving assistance device may recognize signs from the image acquired by an in-vehicle camera, thereby acquiring information on the traffic environment. However, the acquisition source and acquiring method of the information on the traffic environment are not particularly limited.

<Driving Assistance Device>

Hereinafter, an embodiment of the present invention will be described in detail with reference to the drawings. First, the configuration of a driving assistance device 100 according to the present embodiment will be described. FIG. 1 is a view illustrating a configuration of the driving assistance device according to the present embodiment. Also, it is assumed that a subject vehicle 1 to which the driving assistance device 100 is applied is autonomous and has the same components (such as an engine and tires) as those which four-wheeled automobiles generally have, and a description thereof will not be made.

The driving assistance device 100 (see FIG. 1) according to the present embodiment includes an electronic control unit (ECU) 101 which is an example of a processing unit. The ECU 101 is configured with, for example, a processor for performing various processes.

The ECU 101 is configured to be able to execute programs as a processing unit, thereby capable of implementing a cargo-falling predicting unit 102, a front-view monitoring unit 103, a fallen-object detecting unit 104, an information providing unit 105, an inter-vehicle communication control unit 106, and an autonomous-driving control unit 107.

Further, the driving assistance device 100 includes a front-view camera 111 which is an example of an imaging unit for acquiring an image the view in front of the subject vehicle 1, and the front-view camera is electrically connected to the ECU 101 such that the output of the front-view camera is input to the ECU 101. The front-view camera 111 is a video camera for shooting a video, or a digital camera for consecutively taking photos (still images) at intervals of a certain time. It is preferable that the front-view camera 111 be a highly sensitive monitoring camera capable of imaging even at night.

Also, the driving assistance device 100 includes, for example, a gyro sensor 112, an acceleration sensor 113, and a vehicle speed sensor 114, as various sensors for autonomous driving, and these sensors are electrically connected to the ECU 101 such that the outputs of the sensors are input to the ECU 101.

Further, the driving assistance device 100 includes a speed control unit 115 and a steering control unit 116 for changing the speed and direction of the subject vehicle under control of the autonomous-driving control unit 107, and the speed control unit and the steering control unit are electrically connected to the ECU 101 such that they can be controlled by the ECU 101.

Moreover, a storage 121, a sound output unit 122, a communication unit 123, a display unit 124, a navigation device 125, and a GPS reception unit 126 are electrically connected to the ECU 101 such that each unit can transmit signals to the ECU 101 and receive signals from the ECU 101, or each unit can perform either transmission of signals to the ECU 101 or reception of signals from the ECU 101.

Also, the navigation device 125 is electrically connected to the display unit 124 and the GPS reception unit 126, such that the navigation device can control the display unit 124 and receive GPS signals from the GPS reception unit 126.

The cargo-falling predicting unit 102 is configured to predict whether cargoes will fall off, on the basis of images of the view in front of the subject vehicle 1 acquired by the front-view camera 111 (acquired images), as will be described below.

The front-view monitoring unit 103 is configured to recognize preceding vehicles (including cargo vehicles and saddle-ridden type vehicles) and obstacles on the road (including objects fallen on the road), on the basis of front view images, continue to monitor them, and determine whether it is necessary to avoid.

The fallen-object detecting unit 104 is configured to detect whether there is any cargo having moved to three directions i.e. the rear side, the left side, or the right side on the loading platform of a cargo vehicle and having moved toward the ground.

The information providing unit 105 is configured to provide a variety of information to the driver of the subject vehicle 1, cargo vehicles, adjacent vehicles, and oncoming vehicles by controlling the sound output unit 122, the communication unit 123, and the display unit 124. Details of information provision will be described below.

The inter-vehicle communication control unit 106 is configured to perform inter-vehicle communication with other vehicles by controlling the communication unit 123. Inter-vehicle communication includes broadcast communication for transmitting information to other vehicles without requiring acknowledgements (ACK) from the other vehicles, and one-to-one communication for exchanging information with other vehicles after receiving acknowledgements from the other vehicles.

The autonomous-driving control unit 107 mainly performs autonomous driving control on the subject vehicle 1. The autonomous-driving control unit is configured to perform the acceleration, deceleration, and steering of the subject vehicle 1 by controlling the speed control unit 115 and the steering control unit 116 on the basis of outputs from the gyro sensor 112, the acceleration sensor 113, the vehicle speed sensor 114, and the navigation device 125 and the GPS reception unit 126 for providing map information.

Also, in the driving assistance device 100 (FIG. 1), the storage 121 is configured with one or more storage media of a read only memory (ROM), a random access memory (RAM), and so on, depending on the use.

The sound output unit 122 is configured to output an announcement, for example, with synthetic sound from a speaker (not shown in the drawings).

The driving assistance device may include an alarm generating unit in place of the sound output unit 122. The alarm generating unit is configured to alarm the driver of the subject vehicle 1. The alarm generating unit may be configured with, for example, an alarm generator and a speaker.

An example of the communication unit 123 is a wireless communication unit for performing inter-vehicle communication.

As the display unit 124, for example, a display included in the navigation device 125 (to be described below) may be used, or for example, an overhead display (not shown in the drawings) for projecting images onto front glass may be used.

Alternatively, as the display unit 124, a display of an instrument panel (not shown in the drawings) may be used. Also, in place of the display unit 124, a warning light included in the instrument panel may be used to provide information such as a warning.

The navigation device 125 is configured to display a map on a display (an example of the display unit 124) included in the navigation device, for example, on the basis of map information stored in a storage included in the navigation device.

The GPS reception unit 126 is configured to receive GPS signals from GPS satellites and output the GPS signals to the ECU 101 and the navigation device 125.

Until now, the driving assistance device 100 mounted on a four-wheeled automobile which is the subject vehicle 1 has been described with reference to FIG. 1. However, it is also possible to mount the driving assistance device 100 on an example of a saddle-ridden type vehicle which is another example of the subject vehicle 1. The case where the driving assistance device is mounted on a saddle-ridden type vehicle is different from the case where the driving assistance device is mounted on the four-wheeled automobile in that the driving assistance device transmits information, for example, to an external communication device (not shown in the drawings) built in driver's helmet by the communication unit 123 such that the external communication device can provide the information to the driver, for example, with sound, instead of displaying information on the display unit 124. Naturally, similarly in the case of the four-wheeled automobile, a device mounted on the saddle-ridden type vehicle may be used.

Also, as the external communication device, a head mounted display (an example of the display unit 124) like smart glasses may be used to display information.

However, it goes without saying that the configuration of the driving assistance device 100 for the saddle-ridden type vehicle may have the same configuration as that for the four-wheeled automobile. Also, in the following description, when the subject vehicle 1 is referred to, it means both of the four-wheeled automobile and the saddle-ridden type vehicle.

Figure 2:
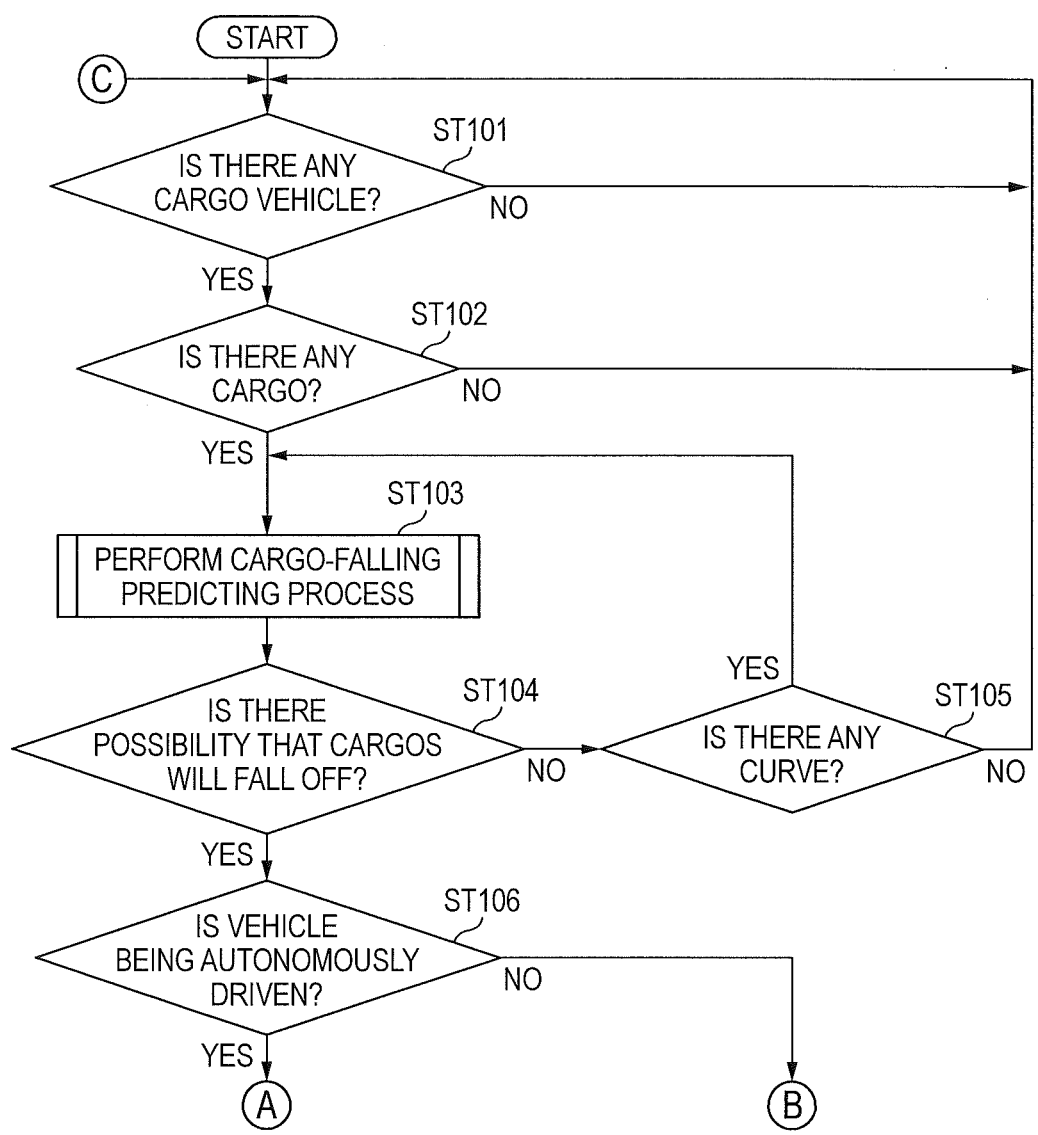
FIG. 2 is a view illustrating a control flow of the driving assistance device according to the embodiment.
Figure 3:
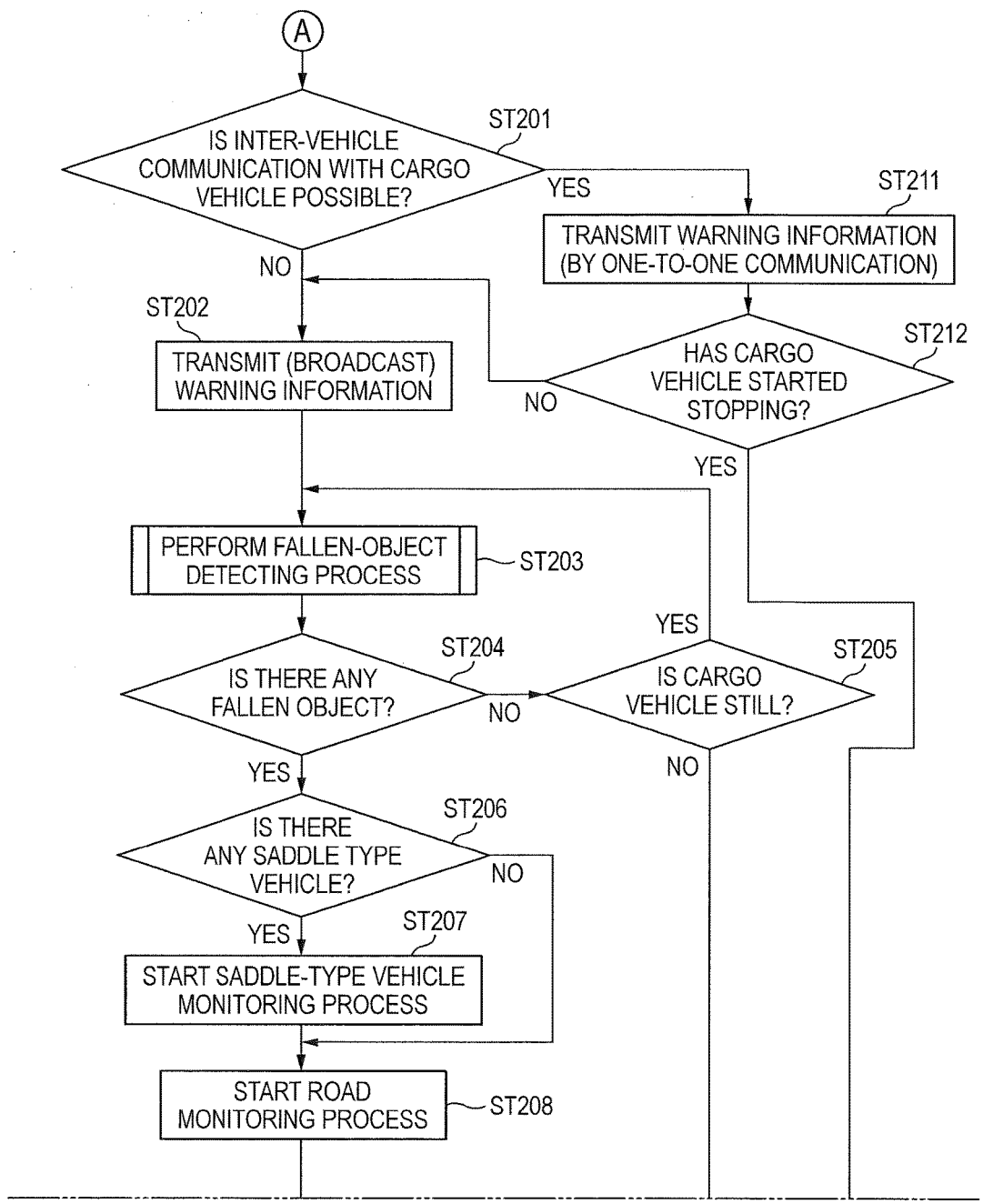
FIG. 3 is a view illustrating the control flow of the driving assistance device according to the embodiment.
Figure 4:
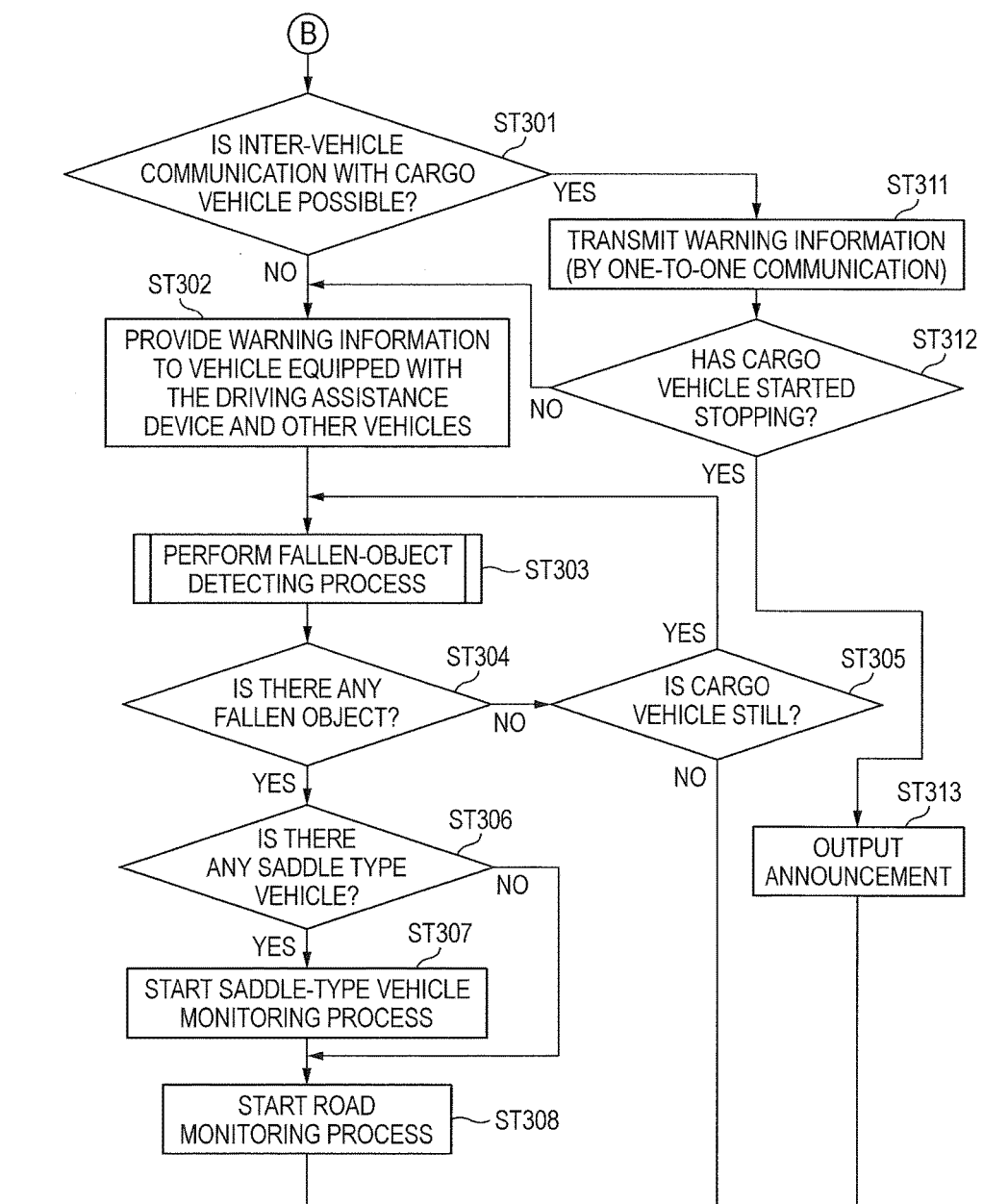
FIG. 4 is a view illustrating the control flow of the driving assistance device according to the embodiment.

Now, a control flow of the driving assistance device 100 according to the present embodiment will be described. FIGS. 2 to 4 are views illustrating the control flow of the driving assistance device 100 according to the present embodiment.

First, in STEP ST101, the front-view monitoring unit 103 (see FIG. 1) continuously monitors the view in front of the subject vehicle 1, and determines whether another vehicle running in the monitoring range is a cargo vehicle. The front-view monitoring unit can perform such a determination by determining whether it is possible to detect the loading platform of a preceding vehicle included in an image of the back of the preceding vehicle acquired by the front-view camera 111. Loading platforms include not only the flat beds of trucks but also roof carriers of general automobiles.

If the determination result of STEP ST101 is "NO", the front-view monitoring unit 103 repeats STEP ST101. If the determination result is "YES", in STEP ST102, the front-view monitoring unit determines whether there is any cargo loaded on the loading platform. If the determination result of STEP ST102 is "NO", the driving assistance device returns to STEP ST101.

<Cargo-Falling Predicting Process>

If the determination result of STEP ST102 is "YES", in STEP ST103, the cargo-falling predicting unit 102 (see FIG. 1) performs a cargo-falling predicting process.

In the present embodiment, the cargo-falling predicting unit 102 predicts whether cargoes loaded on the loading platform of the cargo vehicle will fall off, on the basis of change with time in the profile of the cargoes recognized from images acquired by the front-view camera 111.

In a case where the front-view camera 111 is a video camera, the cargo-falling predicting unit extracts still images from a video at intervals of a certain time (for example, several seconds), and compares an image acquired at a certain time point with the subsequent images, thereby obtaining the amount of change in the profile of the cargoes. In a case where the amount of change in the profile exceeds a threshold, the cargo-falling predicting unit determines that there is a warning sign that the cargoes will fall off and there is a possibility that the cargoes will fall off.

Meanwhile, in a case where the front-view camera 111 is a digital camera, the front-view camera consecutively acquires images at intervals of a certain time, and the cargo-falling predicting unit compares an image acquired at a certain time point with the subsequent images, thereby obtaining the amount of change in the profile of the cargoes. In a case where the amount of change in the profile exceeds a threshold, the cargo-falling predicting unit determines that there is a warning sign that the cargoes will fall off and there is a possibility that the cargoes will fall off.

In a case where the cargoes are fixed with a rope, when comparing the image acquired at the certain time point with the subsequent images, the cargo-falling predicting unit extracts images of the rope, and obtains the amount of slackening of the rope (an example of change in an external appearance) from change in the rope images. In a case where the amount of slackening exceeds a threshold, the cargo-falling predicting unit can determine that there is a warning sign that the cargoes will fall off and there is a possibility that the cargoes will fall off. The same is true even in a case where the fastener is a belt.

It is also possible to determine that there is a possibility that the cargoes will fall off, in a case where both of the amount of change in the profile of the cargoes and the amount of slackening of the rope or the like exceed the thresholds.

Subsequently, as shown in FIG. 2, in STEP ST104, the cargo-falling predicting unit 102 (see FIG. 1) determines whether there is a possibility that the cargoes will fall off, on the basis of the result of the cargo-falling predicting process of STEP ST103. If the determination result of STEP ST104 is "NO", in STEP ST105, the cargo-falling predicting unit 102 determines whether there is a curve which is an example of a traffic environment on the course of the subject vehicle 1, in cooperation with the navigation device 125. If the determination result of STEP ST105 is "YES", the driving assistance device returns to STEP ST103, and performs the cargo-falling predicting process again. If the determination result of STEP ST105 is "NO", the driving assistance device returns to STEP ST101.

Meanwhile, if the determination result of STEP ST104 is "YES", in STEP ST106, the cargo-falling predicting unit 102 determines whether the subject vehicle 1 is being autonomously driven. If the determination result of STEP ST106 is "YES", the driving assistance device proceeds to the control flow for autonomous driving shown in FIG. 3. Meanwhile, if the determination result is "NO", the driving assistance device proceeds to the control flow for manual driving shown in FIG. 4.

<Autonomous Driving>

First, with reference to FIG. 3, the control flow for autonomous driving will be described. In STEP ST201, the inter-vehicle communication control unit 106 (see FIG. 1) determines whether inter-vehicle communication with the cargo vehicle is possible. The inter-vehicle communication control unit 106 can perform such a determination on the basis of whether it can transmit a communication request (REQ) to the cargo vehicle and receive an acknowledgement (ACK) from the cargo vehicle in a predetermined time by controlling the communication unit 123.

If the determination result of the STEP ST201 is "NO", in STEP ST202, the information providing unit 105 transmits warning information for warning that there is a warning sign that the cargoes will fall off and there is a possibility that the cargoes will fall off, to other vehicles running around the subject vehicle 1, in association with the inter-vehicle communication control unit 106.

Here, other vehicles includes following vehicles running in the same lane as that of the subject vehicle 1, adjacent vehicles running in the same direction as that of the subject vehicle 1 in lanes adjacent to the lane where the subject vehicle 1 runs, and oncoming vehicles running in the opposite lanes to that of the subject vehicle 1.

Transmission of the warning information from the subject vehicle 1 to other vehicles can be performed by broadcast transmission which does not require acknowledgements.

If communication devices of other vehicles receive the warning information, in order to warn the drivers of the corresponding vehicles that there is a warning sign that the cargoes will fall off the cargo vehicle and the drivers need to look ahead, on the basis of the warning information, the communication devices display a warning by display unit or output a warning text by sound output unit.

Subsequently, in STEP ST203, the fallen-object detecting unit 104 in the subject vehicle 1 (see FIG. 1) performs a fallen-object detecting process. Specifically, the fallen-object detecting unit 104 detects whether any cargo loaded on the cargo vehicle is moved to a rear side or a lateral side relative the loading platform and is moved toward the ground, on the basis of images acquired by the front-view camera 111.

As the images acquired by the front-view camera 111, similarly in the case described with respect to the cargo-falling predicting process of STEP ST103, images (still images) extracted from a video, and photos (still images) consecutively acquired can be used.

The fallen-object detecting unit can detect whether there is any cargo having moved to the rear side on the loading platform and having moved (fallen) toward the ground, on the basis of detection on whether any object has crossed a horizontal line set with reference to the loading platform of the preceding vehicle, for example, as described with respect to Patent Document 1.

Also, the fallen-object detecting unit can detect whether there is any cargo having moved to the rear side on the loading platform and having moved (fallen) toward the ground, for example, on the basis of detection on whether any object has crossed vertical lines set with reference to the side surfaces of the preceding vehicle.

It goes without saying that detection on fallen objects is not limited to the above-described method, and those skilled in the art can appropriately use well-known technologies.

In STEP ST204, on the basis of the detection result of the fallen-object detecting process of STEP ST203, the fallen-object detecting unit 104 determines whether there is any fallen object. If the determination result of STEP ST204 is "NO", in STEP ST205, the front-view monitoring unit 103 (see FIG. 1) determines whether the cargo vehicle is still in front of the subject vehicle 1. If the determination result of STEP ST205 is "YES", the driving assistance device returns to STEP ST203, and continues to detect fallen objects. Meanwhile, if the determination result of STEP ST205 is "NO", the driving assistance device proceeds to STEP ST213 and performs determination on finish of driving (to be described below).

If the determination result of STEP ST204 is "YES", in STEP ST206, the front-view monitoring unit 103 determines whether there is any saddle-ridden type vehicle in front of the subject vehicle 1. If the determination result of STEP ST206 is "YES", in STEP ST207, the front-view monitoring unit 103 starts a saddle-ridden type vehicle monitoring process.

In the saddle-ridden type vehicle monitoring process, the front-view monitoring unit 103 continuously monitors the saddle-ridden type vehicle, and detects whether any event which the subject vehicle 1 needs to avoid, such as falling down of the saddle-ridden type vehicle has occurred.

If the determination result of STEP ST206 is "NO", the driving assistance device proceeds to STEP ST208, without performing STEP ST207.

In STEP ST208, the front-view monitoring unit 103 starts a road monitoring process. In the road monitoring process, the front-view monitoring unit 103 continuously monitors the road in front of the subject vehicle 1, and detects whether any event which the subject vehicle 1 needs to avoid has occurred, such as whether there is any obstacle such as a fallen object.

Thereafter, in STEP ST209, on the basis of the results of the saddle-ridden type vehicle monitoring process and the road monitoring process, the autonomous-driving control unit 107 determines whether any event which the subject vehicle 1 needs to avoid has occurred. If the determination result of STEP ST209 is "YES", in STEP ST210, the autonomous-driving control unit 107 performs an avoiding process. Avoiding includes securing a sufficient inter-vehicle distance by deceleration, changing lanes or the course by steering, and the like. A measure against saddle-ridden type vehicles and a measure against fallen objects may be different, or may be the same.

If the determination result of STEP ST209 is "NO", the driving assistance device proceeds to STEP ST213 and performs determination on finish of driving (to be described below).

Meanwhile, if the determination result of STEP ST201 (see FIG. 3) is "YES", in STEP ST211, the information providing unit 105 transmits warning information for warning that there is a warning sign that the cargoes will fall off and there is a possibility that the cargoes will fall off, to the cargo vehicle, in association with the inter-vehicle communication control unit 106.

The information providing unit can transmit the warning information from the subject vehicle 1 to the cargo vehicle by one-to-one communication requiring an acknowledgement.

If a communication device of the cargo vehicle receives the warning information, in order to warn the drivers of other vehicles that there is a warning sign that the cargoes will fall off the cargo vehicle and the drivers needs to look ahead, on the basis of the warning information, the communication device displays a warning by the display unit 124 or outputs a warning text by the sound output unit 122.

Subsequently, in STEP ST212, the front-view monitoring unit 103 in the subject vehicle 1 determines whether the cargo vehicle has started stopping. The front-view monitoring unit can perform such a determination, for example, on the basis of turning on of the brake lamps of the cargo vehicle, flashing of hazard lamps, or changing of the course of the cargo vehicle to the road shoulder or the like.

If the determination result of STEP ST212 is "NO", the driving assistance device proceeds to STEP ST202. If the determination result is "YES", the driving assistance device proceeds to STEP ST213 and performs determination on finish of driving.

In STEP ST213, as determination on finish of driving, the ECU 101 (see FIG. 1) determines whether driving has finished, for example, on the basis of whether the engine is operating. If the determination result of STEP ST213 is "NO", the driving assistance device returns to STEP ST101 shown in FIG. 2. Meanwhile, if the determination result is "YES", the driving assistance device finishes the whole process.

<Manual Driving>

Now, with reference to FIG. 4, the control flow for manual driving will be described. The same points as those of the control flow shown in FIG. 4 will not be described, unless especially specified. In STEP ST301, the inter-vehicle communication control unit 106 (see FIG. 1) determines whether inter-vehicle communication with the cargo vehicle is possible.

If the determination result of STEP ST301 is "NO", in STEP ST302, the information providing unit 105 provides warning information to the subject vehicle 1 and other vehicles running around the subject vehicle 1. First, in order to warn the driver of the subject vehicle 1 that there is a warning sign that the cargoes will fall off and the driver needs to look ahead, the information providing unit 105 displays a warning by the display unit 124 or outputs a warning text by the sound output unit 122.

Further, the information providing unit 105 transmits the warning information for warning there is a warning sign that the cargoes will fall off and there is a possibility that the cargoes will fall off, to other vehicles running around the subject vehicle 1, in cooperation with the inter-vehicle communication control unit 106.

The processes of the subsequent steps, i.e. STEPS ST303 to ST309 are identical to STEPS ST203 to ST309 of the control flow described with reference to FIG. 3.

If the determination result of STEP ST309 is "YES", in STEP ST310, the information providing unit 105 outputs an announcement to the driver of the subject vehicle 1.

As announcements, there are an announcement (A) for urging to perform an avoiding response, an announcement (B) for urging to look the road, and an announcement (C) for urging to be careful of saddle-ridden type vehicles.

The information providing unit 105 can output the announcements by controlling the display unit 124 and the sound output unit 122.

Meanwhile, if the determination result of STEP ST301 (see FIG. 4) is "YES", in STEP ST311, the information providing unit 105 transmits warning information for warning that there is a warning sign that the cargoes will fall off and there is a possibility that the cargoes will fall off, to the cargo vehicle, in cooperation with the inter-vehicle communication control unit 106.

Subsequently, in STEP ST312, the front-view monitoring unit 103 in the subject vehicle 1 determines whether the cargo vehicle has started stopping.

If the determination result of STEP ST312 is "NO", the driving assistance device proceeds to STEP ST302. If the determination result of STEP ST312 is "YES", in STEP ST313, the inter-vehicle communication control unit 106 outputs an announcement for urging the driver of the subject vehicle 1 to look the cargo vehicle carefully. Thereafter, the driving assistance device proceeds to STEP ST314 and performs determination on finish of driving.

If the result of determination of STEP ST314 on finish of driving is "NO", the driving assistance device returns to STEP ST101 shown in FIG. 2. Meanwhile, if the determination result of STEP ST 314 is "YES", the driving assistance device finishes the whole process.

The order of the individual processes of the control flow of the driving assistance device described above is an example, and those skilled in the art can understand that it is possible to change the order.

As described above, the driving assistance device 100 of the present embodiment predicts that the cargoes will fall off by recognizing a warning sign that at least some of the cargoes will fall off, on the basis of change with time in the profile or the like of the cargoes or the accompanying object of the cargoes recognized from images of the cargoes or the accompanying object included in front view images consecutively acquired. In the case of predicting that the cargoes will fall off, the driving assistance device provides information representing the cargoes will fall off (such as warning information). Therefore, it is possible to improve preventive safety.

In the subject vehicle 1, during manual driving, on the basis of the warning information, the driving assistance device urges the driver of the subject vehicle 1 to look in front of the subject vehicle 1 (STEP ST302 of FIG. 4). Therefore, as compared to the case where the cargoes suddenly fall off, the driver can more easily find out falling objects (cargoes) and easily avoid the falling objects.

Also, in the subject vehicle 1, the fallen-object detecting unit 104 detects whether there is any cargo moved to the rear side or the lateral side relative to the loading platform of the cargo vehicle and moved (fallen) toward the ground (STEP ST203 of FIG. 3 and STEP ST303 of FIG. 4), and if the fallen-object detecting unit detects any fallen object, the front-view monitoring unit 103 continuously monitors the road (STEP ST208 of FIG. 3 and STEP ST308 of FIG. 4). Further, when avoiding is necessary (STEP ST209 of FIG. 3 and STEP ST309 of FIG. 4), if autonomous driving is being performed, the autonomous-driving control unit 107 is controlled such that it performs avoiding (STEP ST210 of FIG. 3); whereas if manual driving is being performed, an announcement for urging to avoid (STEP ST310 of FIG. 4) is output such that the driver can avoid. As a result, it is possible to further improve preventive safety.

Especially, if movement of the cargoes to three directions, i.e. the rear side, the left side, and the right side on the loading platform is monitored with respect to falling of the cargoes as in the present embodiment, it is possible to accurately perform detection on fallen objects.

Figure 5:
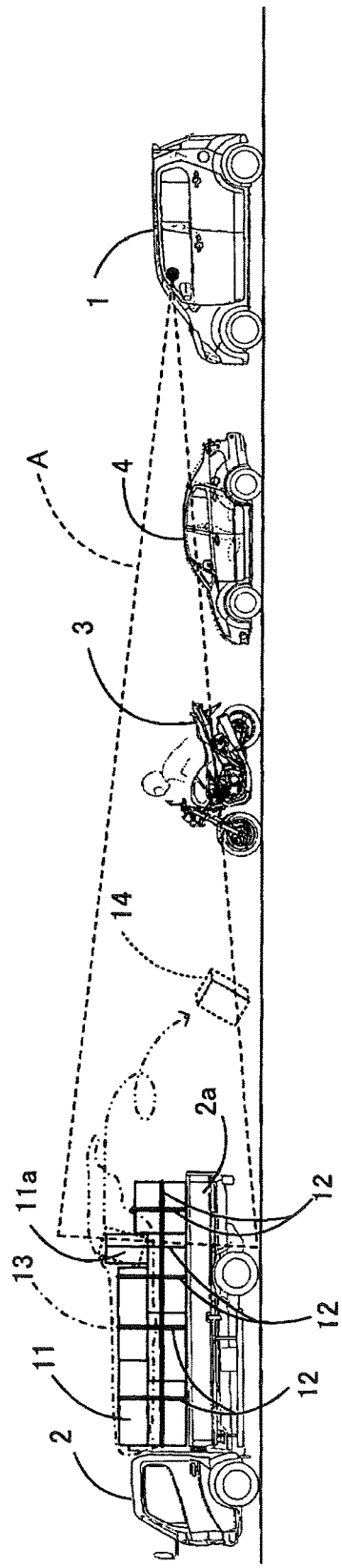
FIG. 5 is a schematic diagram illustrating a state in which a saddle-ridden type vehicle is running between a subject vehicle equipped with the driving assistance device and a cargo vehicle according to the embodiment.
Figure 6:
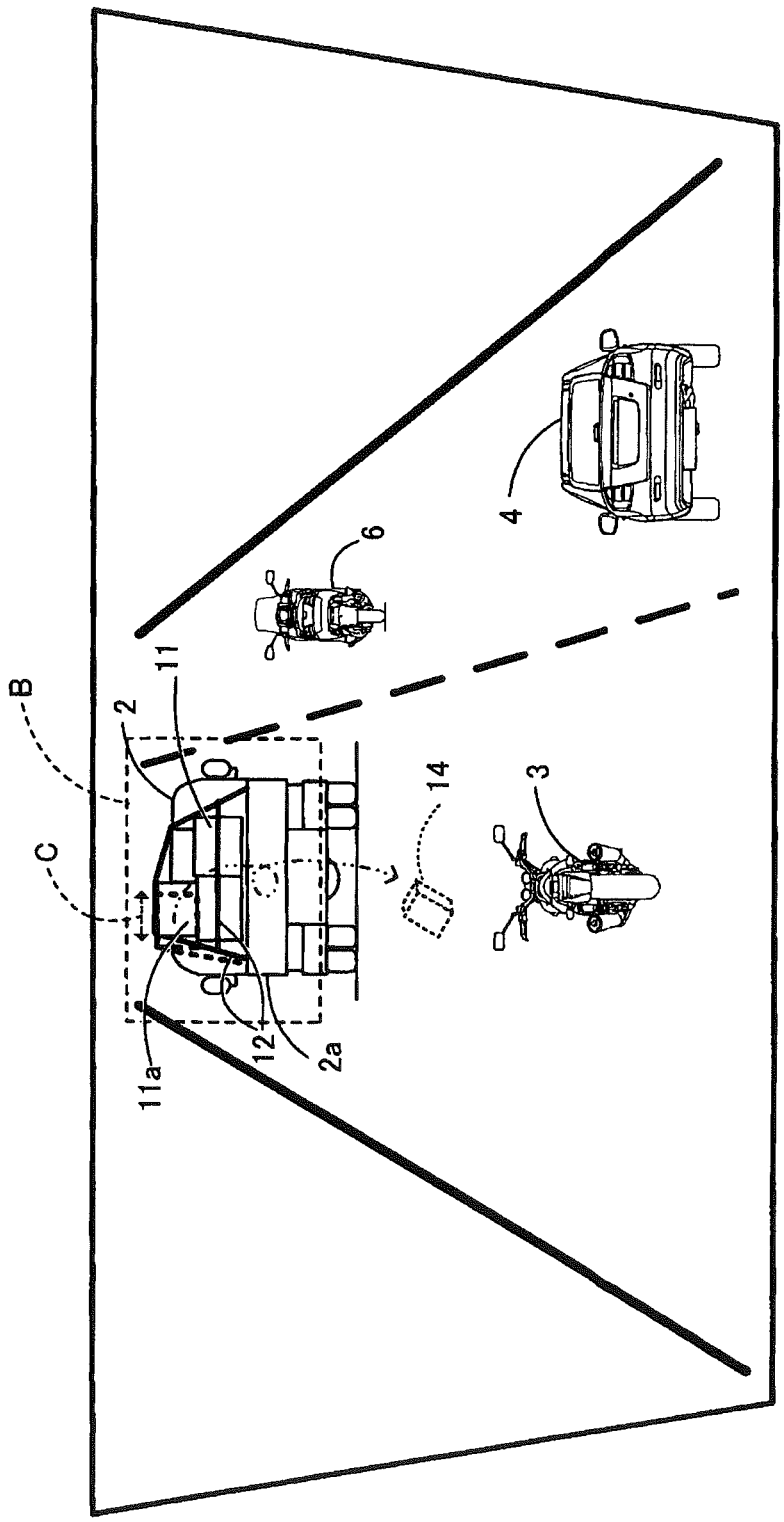
FIG. 6 is a schematic diagram illustrating a front view image acquired by a front-view camera in the driving assistance device according to the embodiment.

Further, if a fallen object is detected, the front-view monitoring unit 103 (see FIG. 1) detects whether there is any saddle-ridden type vehicle running between the subject vehicle 1 and the cargo vehicle, and continuously monitors the saddle-ridden type vehicle 3 (STEPS ST206 and ST207 of FIG. 3 and STEPS ST306 and ST307 of FIG. 4). FIG. 5 is a schematic diagram illustrating a state where a saddle-ridden type vehicle 3 is running between the subject vehicle 1 and a cargo vehicle in the present embodiment. FIG. 6 is a schematic diagram illustrating a front view image acquired by the front-view camera 111 in the driving assistance device according to the present embodiment.

In FIGS. 5 and 6, a reference symbol "4" represents a four-wheeled automobile which is another vehicle running in an adjacent lane. Also, in FIG. 5, a broken line "A" represents a monitoring range from the subject vehicle 1. In FIG. 6, a broken line "B" represents the image range of cargoes of a cargo vehicle 2. Also, a reference symbol "6" represents a saddle-ridden type vehicle which is another vehicle running in an adjacent lane. Further, an arrow "C" represents a direction in which the profile of cargoes 11 changes with time.

As shown in FIGS. 5 and 6, a saddle-ridden type vehicle 3 may be running between the subject vehicle 1 and a cargo vehicle 2. On a loading platform 2a of the cargo vehicle 2, there are a plurality of cargoes 11 loaded, and fixed with a rope 12, and covered with a sheet 13. However, in FIG. 6, for convenience, the sheet 13 is not shown. In this state, for example, if the rope 12 slackens, and the sheet 13 is taken off, and one cargo 11a on the rear side of the loading platform 2a of the cargo vehicle 2 falls to the road, the saddle-ridden type vehicle 3 may lose its balance and fall down while trying to avoid a suddenly fallen object 14.

In the present embodiment, since the front-view monitoring unit 103 (see FIG. 1) continues to monitor the saddle-ridden type vehicle 3 even in such a dangerous situation, when an event such as overturning which the subject vehicle 1 needs to avoid occurs (STEP ST209 of FIG. 3 and STEP ST309 of FIG. 4), if autonomous driving is being performed, the driving assistance device controls the autonomous-driving control unit 107 such that it performs avoiding (STEP ST210 of FIG. 3); whereas if manual driving is being performed, the driving assistance device outputs an announcement for urging to avoid (STEP ST310 of FIG. 4) such that the driver can avoid. As a result, it is possible to further improve preventive safety.

Also, in the present embodiment, the information providing unit 105 transmits warning information to oncoming vehicles, adjacent vehicles, and following vehicles (STEP ST202 of FIG. 3 and STEP ST302 of FIG. 4). As a result, as compared to the case where the cargoes suddenly fall off, the drivers of those other vehicles can more easily find out falling objects. Therefore, it is possible to improve preventive safety.

Figure 7:
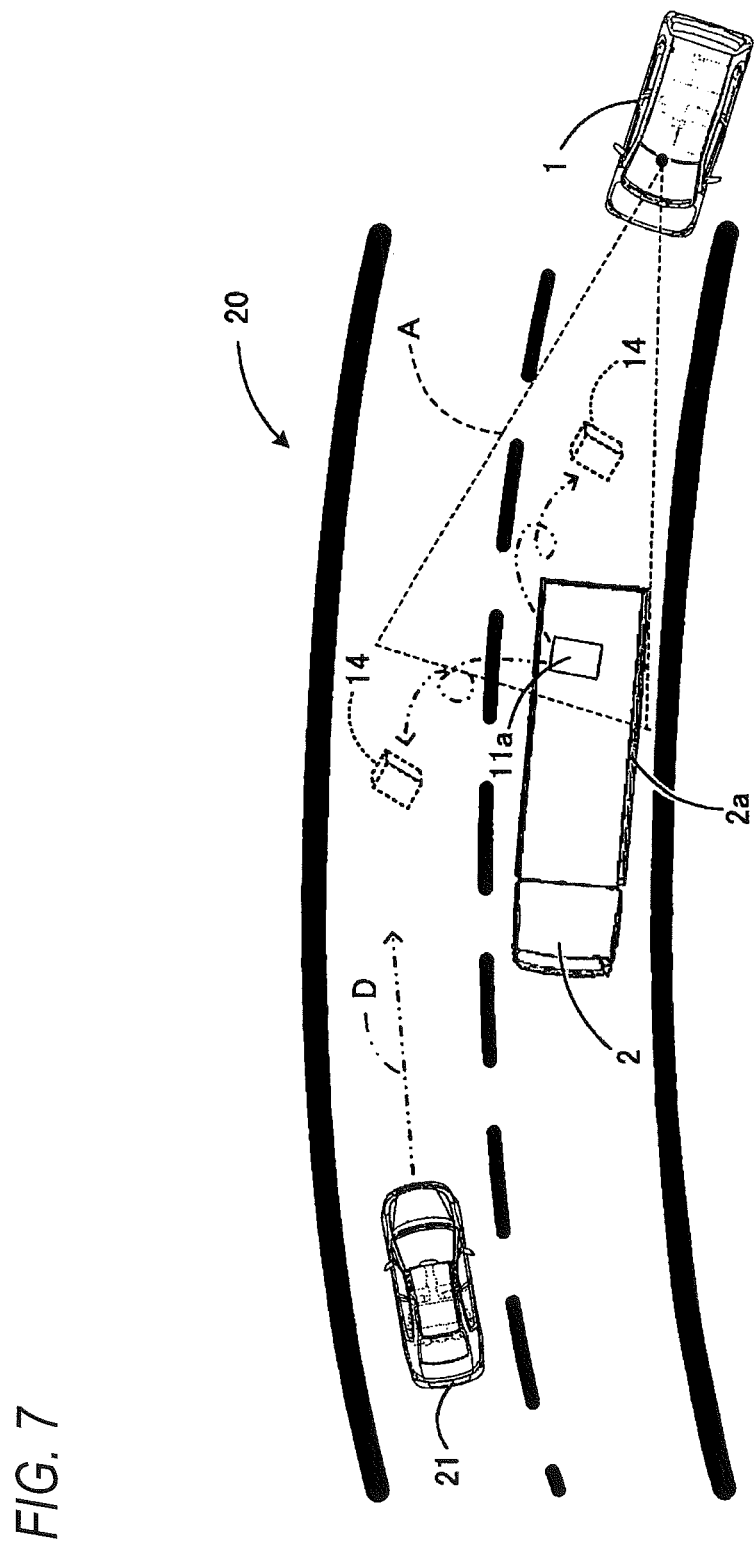
FIG. 7 is a schematic diagram illustrating a relation of the subject vehicle equipped with the driving assistance device, the cargo vehicle, and an oncoming vehicle according to the embodiment.

FIG. 7 is a schematic diagram illustrating the relation of the subject vehicle 1, the cargo vehicle 2, and an oncoming vehicle in the present embodiment. Of the plurality of cargoes 11 loaded on the loading platform of the cargo vehicle 2, only the cargo 11a likely to fall off is shown in FIG. 7. Also, components identical to those shown in FIGS. 5 and 6 are denoted by the same reference symbols, and will be described.

As shown in FIG. 7, in a case where a road 20 is curved, since the driver of an oncoming vehicle 21 looks in front of the oncoming vehicle 21 as shown by a two-dot chain line arrow D in FIG. 7, the top of the loading platform 2a of the cargo vehicle 2 is not seen from the oncoming vehicle 21 or is likely to become invisible from the oncoming vehicle. However, even in such a situation, if any cargo 11 falls off, the subject vehicle 1 can detect falling of the cargo. Therefore, the information providing unit 105 (see FIG. 1) of the subject vehicle 1 can transmit warning information to the oncoming vehicle 21 (STEP ST202 of FIG. 3 and STEP ST302 of FIG. 4). As a result, the driver of the oncoming vehicle 21 can receive the warning information from the communication device of the oncoming vehicle 21, and look at the surface of the road 20 carefully. Therefore, even through there is the fallen object 14 on the opposite lane of the road 20, the driver of the oncoming vehicle can more easily find out the fallen object 14 as compared to the case where a cargo has suddenly fallen off. Therefore, it is possible to improve preventive safety.

Figure 8:
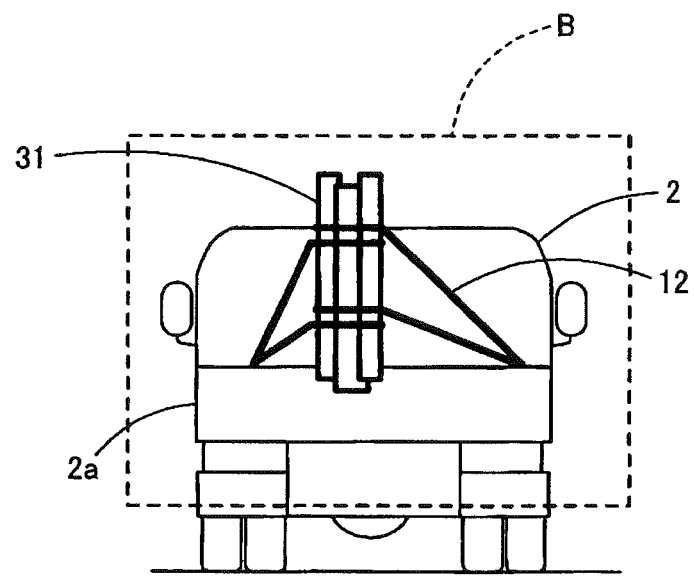
FIG. 8 is a schematic diagram illustrating an image which is acquired in a case where cargoes are elongated objects.

FIG. 8 is a schematic diagram illustrating an image which is acquired in the present embodiment in a case where cargoes are elongated objects. Components of FIG. 8 that are identical to those of FIGS. 5 to 7, are denoted by the same reference symbols, and will not be described. As shown in FIG. 8, even in a case where cargoes are elongated objects 31, it is possible to predict that the cargoes will fall off, by recognizing a warning sign that the cargoes will fall off, on the basis of change with time in the profile of the elongated objects 31 or the amount of slackening of the rope 12. When the road 20 is curved as shown in FIG. 7, if the elongated objects 31 fall to the opposite lane of the road 20, they cause significant damage to the oncoming vehicle 21. However, even in such a situation, the information providing unit 105 (see FIG. 1) of the subject vehicle 1 transmits warning information to the oncoming vehicle 21 (STEP ST202 of FIG. 3 and STEP ST302 of FIG. 4). As a result, the driver of the oncoming vehicle 21 can receive the warning information from the communication device of the oncoming vehicle 21, and look at the surface of the road 20 carefully. Therefore, the driver of the oncoming vehicle can more easily avoid the elongated objects 31 as compared to the case where the cargoes have suddenly fallen off, and thus it is possible to improve preventive safety.

Also, according to the driving assistance device 100 of the present embodiment, the information providing unit 105 (see FIG. 1) provides warning information to the cargo vehicle (STEP ST211 of FIG. 3 and STEP ST311 of FIG. 4). In this way, it is possible to urge the driver of the cargo vehicle to check collapse of the cargoes and correctly re-stack the cargoes. As a result, it is possible to prevent dangerous falling of the cargoes, and improve preventive safety.

Also, even in a case where the cargo-falling predicting unit 102 (see FIG. 1) determines that there is no possibility that the cargoes will fall off (STEP ST104 of FIG.2), the driving assistance device 100 of the present embodiment continues to predict whether the cargoes will fall off, on the basis of information on the traffic environment of the course of the subject vehicle 1 (STEP ST105 of FIG. 2). Therefore, for example, even in a case where the force of inertia acts due to the curve shown in FIG. 2, a sloping road, temporal stopping, stopping at a traffic signal, whereby the cargoes fall off, it is possible to take a measure. Therefore, it is possible to further improve preventive safety.

Also, the present invention is not limited to the embodiment mentioned above and can be modified and implemented in various forms. With respect to the sizes, shapes, and the like of the embodiment shown in the accompanying drawings, the present invention is not limited thereto and can be appropriately modified.

For example, in the above-described embodiment, images acquired by the front-view camera 111 (see FIG. 1) may be stored in the storage 121. In this case, if falling of the cargoes causes a traffic accident and the accident is put on trial, it is possible to use the images as strong evidence to prove that the falling of the cargoes was the cause.

Also, in a case where the cargoes loaded on the loading platform 2a of the cargo vehicle 2 are the elongated objects 31 as shown in FIG. 8, it is also possible to recognize the elongated objects 31 from images of them by the front-view monitoring unit 103, and include additional information representing that the cargoes are an elongated object type, in the warning information to be transmitted to other vehicles.

As a result, the driver of the oncoming vehicle 21 can look the road in front while considering that there is a possibility that the elongated objects 31 will fall off, and more easily avoid the elongated objects 31. Therefore, it is possible to further improve preventive safety.

As described above, some embodiments of the present invention have the effect that it is possible to detect a warning sign that cargoes loaded on the loading platform of a preceding vehicle will fall off, and warn that the cargoes will fall off, thereby improving preventive safety, and is useful particularly in driving assistance devices for four-wheeled automobiles, saddle-ridden type vehicles, and the like.

What is claimed is:

1. A driving assistance device configured to be equipped in a subject vehicle, comprising:
    an imaging unit configured to acquire an image of a preceding vehicle running in front of the subject vehicle equipped with the driving assistance device;
    a cargo-falling predicting unit configured to predict whether a cargo loaded on a loading platform of the preceding vehicle will fall off, from change with time in an image of the cargo or an image of an accompanying object of the cargo on the basis of the image acquired by the imaging unit; and
    an information providing unit configured to provide information on falling of the cargo if the cargo-falling predicting unit predicts that the cargo will fall off.

2. The driving assistance device according to claim 1, wherein the change with time in the image of the cargo or the accompanying object is change in a profile of the cargo or the accompanying object.

3. The driving assistance device according to claim 1, further comprising a fallen-object detecting unit configured to detect whether the cargo is moved to a rear side or a lateral side with respect to the loading platform and is moved toward a ground.

4. The driving assistance device according to claim 1, further comprising a saddle-ridden type vehicle monitoring unit configured to monitor a saddle-ridden type vehicle running between the subject vehicle and the preceding vehicle.

5. The driving assistance device according to claim 1, wherein the change with time in the image of the accompanying object of the cargo is change in an external appearance of a fastener for fixing the cargo to the loading platform.

6. The driving assistance device according to claim 1, wherein the information providing unit provides the information on the falling of the cargo to at least one of the subject vehicle, an oncoming vehicle, another vehicle running in a lane adjacent to a lane where the subject vehicle runs, and a following vehicle.

7. The driving assistance device according to claim 1, wherein the information providing unit provides the information on the falling of the cargo to the preceding vehicle.

8. The driving assistance device according to claim 1, wherein even when determining that there is no possibility that the cargo will fall off, the cargo-falling predicting unit continues to predict whether the cargo will fall off, on the basis of information on a traffic environment of a course of the subject vehicle.

9. The driving assistance device according to claim 1, wherein the subject vehicle equipped with the driving assistance device is an autonomous vehicle.

* * * * *